3,340,303
METHOD FOR PRODUCTION OF
N-NITROSAMINES
Irving Melville Roberts, Arcadia, Calif., assignor to Aerojet-General Corporation, Azusa, Calif., a corporation of Ohio
No Drawing. Filed June 8, 1964, Ser. No. 373,522
9 Claims. (Cl. 260—583)

This invention relates to a new and improved process for the preparation of dialkyl nitrosamines.

The dialkyl nitrosamines are widely used as starting materials in the preparation of other organic compounds. For example, these compounds are reduced by hydrogen in the commercial method for the preparation of unsymmetrical dimethyl hydrazine, a well-known fuel for use in liquid rocket engines. Previously, the dialkyl nitrosamines have been prepared in a continuous vapor phase reaction wherein a dialkyl amine is reacted with a nitrosating agent composed of an equimolar mixture of nitric oxide and nitrogen dioxide. Nitrogen dioxide is the basic starting material in the preparation of nitric acid, and as such is readily available in large quantity. In fact, it is possible to obtain the nitrogen dioxide required by merely tapping the process stream in an existing nitric acid production facility. However, the nitric oxide required in the above-described process is not normally available in quantity, and hence if the dialkyl nitrosamines are to be prepared by this process it is necessary that a special plant be constructed solely for the purpose of producing nitric oxide. This additional requirement in plant and equipment clearly adds to the production cost of the dialkyl nitrosamines.

According to my invention, it has now been found that the dialkyl nitrosamines can be readily prepared in good yield without the need for substantial quantities of nitric oxide. More specifically, it has now been found that the use of nitric oxide in the continuous vapor phase nitrosation of dialkyl amines can be limited exclusively to a small quantity employed during the start-up of the process. I have discovered that once the nitrosation reaction has commenced, no further nitric oxide need be added, and that good yields of the desired dialkyl nitrosamines are obtained using nitrogen dioxide as the sole added nitrosating agent.

While not bound by any theory, it is believed that the elimination of the need for the continuous addition of nitric oxide is due to the fact that, in the nitrosation of the dialkyl amines in the vapor phase, there continuously occurs the following two reactions:

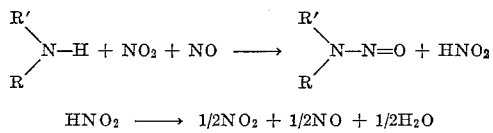

$$HNO_2 \longrightarrow 1/2 NO_2 + 1/2 NO + 1/2 H_2O$$

wherein R and R' are lower alkyl. As can be seen from the above equations, once the reaction has been initiated with the assistance of a small amount of nitric oxide, the conversion to the dialkyl nitrosamine then proceeds in the desired manner, solely by the further addition of nitrogen dioxide, the additional nitric oxide required being generated in situ from the by-product nitrous acid produced. It has also been observed that the process of my invention provides other advantages over the method of the prior art. For example, in the process of this invention, the reaction proceeds at lower temperatures and in a more controlled fashion, and higher conversions of the dialkyl amines to the dialkyl nitrosamines result.

Therefore, it is an object of this invention to nitrosate dialkyl amines in the vapor phase without the use of nitric oxide except at start-up. Still another object of this invention is to produce dialkyl nitrosamines without incurring the cost of providing substantial quantities of the nitric oxide in the nitrosation gas stream. It is a further object of this invention to carry out this nitrosation reaction in a more easily controlled manner at lower temperature and with greater conversion to the desired product. These and other objects of my invention will be apparent from the detailed description which follows.

As has been indicated above, the nitrosation of the dialkyl amine according to the present invention proceeds as shown in the following equation:

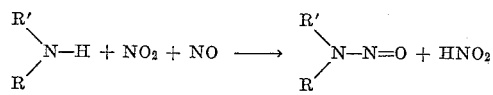

wherein R and R' are as previously defined. Preferably, R and R' contain from 1 to about 6 carbon atoms. These groups may be branched or straight-chain.

This reaction is normally carried out in the vapor phase with the nitrogen dioxide being supplied in pure form or diluted with a dry inert gas, such as nitrogen or argon. The dialkyl amine starting material may be introduced either in a separate gas stream or in conjunction with the nitrogen dioxide gas stream.

To initiate the reaction, the dialkyl amine, nitric oxide and nitrogen dioxide are introduced into the reaction zone. While not critical, these three components are normally introduced in about stoichiometrically equivalent amounts. After an initiating period of from about 5 seconds to about 60 seconds, the temperature will begin to rise at which time the nitrogen monoxide flow is stopped. Thereafter, the reaction will continue for as long as desired with only the dialkyl amine and the nitrogen dioxide stream being added. In this manner, a good yield of the desired dialkyl nitrosamine is continuously produced.

This vapor phase reaction is conducted at a temperature sufficiently high to maintain all of the reactants in the gas phase, and normally at a temperature of from about 80° C. to about 225° C. The temperature may be maintained within the desired range by equipping the reaction zone with a cooling system such as a water jacket. Ordinarily, the reaction is carried out at atmospheric pressure. However, the pressure may be above or below atmospheric, provided that at least a portion of each of the reactants remains in the gaseous phase. Once the reaction has commenced, the addition rates for the dialkyl amines and the nitrogen dioxide stream may be widely varied. In general, best results are obtained when the dialkyl amine and the nitrogen dioxide addition rates are adjusted to provide these two reactants in approximately stoichiometric amounts.

The crude dialkyl nitrosamine produced by the process of this invention is normally recovered from the reaction zone by condensation. The crude product may then be further purified, if desired, by extraction and/or distillation.

The dialkyl nitrosamines of this invention, as indicated above, may be used in the preparation of unsymmetrical dialkyl hydrazines. These compounds are also useful in the preparation of gasoline and lubricant additives, antioxidants and stabilizers for natural and synthetic rubber and other polymeric organic materials, insecticides, fungicides, bactericides, and as intermediates for pharmaceuticals.

As can be seen from the above reaction equation, according to the present invention, there can be obtained dimethyl nitrosoamine from dimethyl amine, methylethyl nitrosoamine from methylethyl amine, dipropyl nitrosamine from dipropyl amine, ditertiarybutyl nitrosamine from ditertiarybutyl amine, ethylpentyl nitrosamine from ethylpentyl amine and dihexyl nitrosamine from dihexyl amine.

The following examples are provided solely for the purpose of illustration and should not be regarded as limita-

EXAMPLE I

Preparation of dimethyl nitrosamine

A gas stream containing 1.34 l./min. (0.06 mole/min.) NO₂; 1.34 l./min. (0.06 mole/min.) NO; and 1.35 l./min. or N₂ was introduced into a water-jacketed glass reaction tube, fitted at the lower end with a glass receiver. Dimethyl amine gas was introduced into the gas stream at a rate of 0.0573 mole per minute. About 20 seconds after the dimethylamine flow was started, the temperature started to rise. At this time, the nitric oxide flow was stopped. The reaction was then run for 24 minutes. During the course of the reaction, the temperature reached a maximum of 104° C. at the site of introduction of the dimethyl amine. At a point about 3 inches below the site of introduction of the amine, the maximum temperature was about 114° C. At a point 4½ inches below, the temperature reached a maximum of 198° C. About 2 inches below this, the maximum temperature was 171° C. About 10 grams of product condensed in the receiver as well as along the walls of the equipment. This material analyzed at 65 percent dimethyl nitrosamine.

EXAMPLE II

Preparation of diethyl nitrosamine

A gas stream containing 0.06 mole/min. NO₂; 0.06 mole/min. NO; and about 1.35 l./min. of N₂ is introduced into a water-jacketed glass reaction tube, fitted at the lower end with a glass receiver. Diethyl amine gas is introduced into the gas stream at a rate of about 0.05 mole per minute. About 20 seconds after the diethylamine flow is starter, the temperature starts to rise. At this time, the nitric oxide flow is stopped. The reaction is then run for about 24 minutes. During the course of the reaction, the temperature reached a maximum of about 100° C. at the site of introduction of the diisopropylamine. About 10 diethyl nitrosamine is obtained.

EXAMPLE III

Preparation of diisopropyl nitrosamine

A gas stream containing 0.06 mole/min. NO₂; 0.06 mole/min. NO; and 1.35 l./min. of N₂ is introduced into a water-jacketed glass reaction tube, fitted at the lower end with a glass receiver. Diisopropyl amine gas is introduced into the gas stream at a rate of 0.05 mole per minute. About 20–30 seconds after the diisopropylamine flow is started, the temperature starts to rise. At this time, the nitric oxide flow is stopped. The reaction is then run for about 30 minutes. During the course of the reaction, the temperature reaches a maximum of about 135° C. at the site of introduction of the diisopropylamine. About 10 grams of product containing a substantial portion of diisopropyl nitrosamine is obtained.

EXAMPLE IV

Preparation of dibutyl nitrosamine

A gas stream containing 0.06 mole/min. NO₂; 0.06 mole/min. NO; and 1.35 l./min. of N₂ is introduced into a jacketed glass reaction tube, fitted at the lower end with a glass receiver. Dibutyl amine gas is introduced into the gas stream at a rate of 0.06 mole per minute. About 30 seconds after the dibutylamine flow is started, the temperature starts to rise. At this time, the nitric oxide flow is stopped. The reaction was then run for about 20–25 minutes. During the course of the reaction, the temperature was maintained at a maximum of about 170° C. at the point of introduction of the dibutyl amine. The product condensed in the receiver, and represented a good yield of dibutyl nitrosamine.

The dialkyl nitrosamines obtained according to the process of this invention are converted to the corresponding unsymmetrical dialkyl hydrazines by hydrogen reduction. This reduction may be advantageously accomplished by conducting the reaction in aqueous or alcoholic media in the presence of an effective catalytic amount (less than 20 percent by weight of reactants) of palladium catalysts such as palladium charcoal, palladium-calcium carbonate and palladium-barium sulfate. Collodial palladium may also be used, as well as finely divided palladium on carriers such as silica gel, alumina, and other catalyst carriers. The reduction reaction is shown by the following equation:

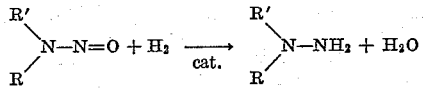

wherein R and R' are lower alkyl, as previously defined. The process lends itself equally well to continuous or batch operations. This reduction reaction is described in greater detail in assignee's co-pending U.S. application Ser. No. 382,828, filed Sept. 28, 1953.

Having fully described by invention, it is intended that it be limited only by the lawful scope of the appended claims.

I claim:

1. The method of nitrosating dialkyl amines in vapor phase which comprises initiating the nitrosation reaction by the contacting of a dialkyl amine gas stream with a gaseous mixture of nitric oxide and nitrogen dioxide until an increase in temperature within the reaction zone occurs, and thereupon discontinuing the addition of nitric oxide while continuing the addition of the nitrogen dioxide and dialkylamine, and continuously recovering the dialkyl nitrosamine produced.

2. The method of nitrosating dialkyl amines in vapor phase which comprises initiating the nitrosation reaction by the contacting of a dialkyl amine gas stream with a gaseous mixture of nitric oxide and nitrogen dioxide until an increase in temperature within the reaction zone occurs, and thereupon discontinuing the addition of nitric oxide while continuing the addition of the nitrogen dioxide and dialkylamine, the rate of addition of the nitrogen dioxide being approximately stoichiometrically equivalent to the rate of addition of the dialkyl amine, and continuously recovering the dialkyl nitrosamine produced.

3. The method of nitrosating dialkyl amines in vapor phase which comprises initiating the nitrosation reaction by the contacting of a dialkyl amine gas stream with a gaseous mixture of nitric oxide and nitrogen dioxide until an increase in temperature within the reaction zone occurs, and thereupon discontinuing the addition of nitric oxide while continuing the addition of the nitrogen dioxide and dialkylamine, while maintaining the temperature at from about 80° C. to about 225° C., the rate of addition of the nitrogen dioxide being approximately stoichiometrically equivalent to the rate of addition of the dialkyl amine, and continuously recovering the dialkyl nitrosamine produced.

4. The method of nitrosating dialkyl amines in vapor phase which comprises initiating the nitrosation reaction by the contacting of a dialkyl amine having the formula

with a gaseous mixture of nitric oxide and nitrogen dioxide until an increase in temperature within the reaction zone occurs, and thereupon discontinuing the addition of nitric oxide while continuing the addition of the nitrogen dioxide and dialkylamine, and continuously recovering the dialkyl nitrosamine produced; wherein in the above formula, R and R' are lower alkyl.

5. The method of nitrosating dialkyl amines in vapor phase which comprises initiating the nitrosation reaction by the contacting of a dialkyl amine having the formula

with a gaseous mixture of nitric oxide and nitrogen dioxide until an increase in temperature within the reaction zone occurs, and thereupon discontinuing the addition of nitric oxide while continuing the addition of the nitrogen dioxide and dialkylamine, the rate of addition of the nitrogen dioxide being approximately stoichiometrically equivalent to the rate of addition of the dialkyl amine, and continuously recovering the dialkyl nitrosamine produced; wherein in the above formula, R and R' are lower alkyl.

6. The method of nitrosating dialkyl amines in vapor phase which comprises initiating the nitrosation reaction by the contacting of a dialkyl amine having the formula

with a gaseous mixture of nitric oxide and nitrogen dioxide until an increase in temperature within the reaction zone occurs, and thereupon discontinuing the addition of nitric oxide while continuing the addition of the nitrogen dioxide and dialkylamine, while maintaining the temperature at from about 80° C. to about 225° C., the rate of addition of the nitrogen dioxide being approximately stoichiometrically equivalent to the rate of addition of the dialkyl amine, and continuously recovering the dialkyl nitrosamine produced; wherein in the above formula, R and R' are lower alkyl.

7. The method of nitrosating dimethyl amine in vapor phase which comprises initiating the nitrosation reaction by contacting a dimethyl amine gas stream with a gaseous mixture of nitric oxide and nitrogen dioxide until an increase in temperature within the reaction zone occurs, and thereupon discontinuing the addition of nitric oxide while continuing the addition of the nitrogen dioxide and dimethylamine, and continuously recovering the dimethyl nitrosamine produced.

8. The method of nitrosating dimethyl amine in vapor phase which comprises initiating the nitrosation reaction by contacting a dimethyl amine gas stream with a gaseous mixture of nitric oxide and nitrogen dioxide until an increase in temperature within the reaction zone occurs, and thereupon discontinuing the addition of nitric oxide while continuing the addition of the nitrogen dioxide and dimethylamine, the rate of addition of the nitrogen dioxide being approximately stoichiometrically equivalent to the rate of addition of the dimethyl amine, and continuously recovering the dimethyl nitrosamine produced.

9. The method of nitrosating dimethyl amine in vapor phase which comprises initiating the nitrosation reaction by contacting a dimethyl amine gas stream with a gaseous mixture of nitric oxide and nitrogen dioxide until an increase in temperature within the reaction zone occurs, and thereupon discontinuing the addition of nitric oxide while continuing the addition of the nitrogen dioxide and dimethylamine, while maintaining the temperature at from about 80° C. to about 225° C., the rate of addition of the nitrogen dioxide being approximately stoichiometrically equivalent to the rate of addition of the dimethyl amine, and continuously recovering the dimethyl nitrosamine produced.

References Cited

FOREIGN PATENTS 553,523 2/1958 Canada.
644,820 7/1962 Canada.

CHARLES B. PARKER, *Primary Examiner.*

R. L. RAYMOND, *Assistant Examiner.*